US010613239B2

(12) United States Patent
Manning et al.

(10) Patent No.: US 10,613,239 B2
(45) Date of Patent: Apr. 7, 2020

(54) PROPELLANT STIMULATION FOR MEASUREMENT OF TRANSIENT PRESSURE EFFECTS OF THE PROPELLANT

(71) Applicant: Halliburton Energy Services, Inc., Houston, TX (US)

(72) Inventors: John Douglas Manning, Alvarado, TX (US); Jacob Andrew McGregor, Burleson, TX (US); Gerald Graves Craddock, Jr., Mansfield, TX (US); John Norris Smith, Burleson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 236 days.

(21) Appl. No.: 15/763,327

(22) PCT Filed: Jun. 2, 2017

(86) PCT No.: PCT/US2017/035677
§ 371 (c)(1),
(2) Date: Mar. 26, 2018

(87) PCT Pub. No.: WO2018/222207
PCT Pub. Date: Dec. 6, 2018

(65) Prior Publication Data
US 2019/0064375 A1    Feb. 28, 2019

(51) Int. Cl.
*G01V 1/104*    (2006.01)
*G01V 1/50*    (2006.01)
(Continued)

(52) U.S. Cl.
CPC ............ *G01V 1/104* (2013.01); *E21B 43/117* (2013.01); *E21B 43/1185* (2013.01); *G01V 1/50* (2013.01)

(58) Field of Classification Search
CPC ...... G01V 1/104; G01V 1/50; E21B 43/1185; E21B 43/117
See application file for complete search history.

(56) References Cited

U.S. PATENT DOCUMENTS 6,336,506 B2 *    1/2002    Wesson .................. E21B 37/08
166/308.1
7,228,906 B2 *    6/2007    Snider .................. E21B 43/263
166/299

(Continued)

FOREIGN PATENT DOCUMENTS

WO    2012/082144 A1    6/2012

OTHER PUBLICATIONS

International Search Report and Written Opinion issued in related PCT Application No. PCT/US2017/035677 dated Feb. 27, 2018, 17 pages.

*Primary Examiner* — Freddie Kirkland, III
(74) *Attorney, Agent, or Firm* — Alan Bryson; Baker Botts L.L.P.

(57) ABSTRACT

Simulation of downhole transient pressure effects due to propellant stimulation of a formation provides information that may be utilized to select a type of perforating tool system and other components that contribute to effective stimulation of a formation. A well simulator pressure vessel comprises a perforating tool system that comprises a type of perforating gun assembly that includes one or more shaped charges. A propellant disk assembly adjacent to a sample formation is coupled to the perforating tool system. The propellant disk assembly comprises one or more components for securing the propellant. A transient pressure effect may be measured once the one or more shaped charges are detonated and the propellant is ignited or deflagrated. The measured transient pressure effects may be utilized to alter (Continued)

or change the one or more components of the perforating tool system prior to, during, or after stimulation of the sample formation.

20 Claims, 6 Drawing Sheets

(51) Int. Cl.
*E21B 43/1185* (2006.01)
*E21B 43/117* (2006.01)

(56) References Cited

U.S. PATENT DOCUMENTS

| | | | | |
|---|---|---|---|---|
| 7,533,722 | B2* | 5/2009 | George | E21B 43/1195 |
| | | | | 166/299 |
| 7,861,609 | B2* | 1/2011 | Haggerty | G01N 33/24 |
| | | | | 73/866.5 |
| 8,899,320 | B2* | 12/2014 | Le | E21B 43/11 |
| | | | | 166/250.07 |
| 9,689,246 | B2* | 6/2017 | Braithwaite | E21B 43/263 |
| 2001/0001418 | A1 | 5/2001 | Wesson | |
| 2005/0109509 | A1 | 5/2005 | Snider et al. | |
| 2007/0240873 | A1 | 10/2007 | George et al. | |
| 2009/0241700 | A1 | 10/2009 | Haggerty et al. | |
| 2012/0152542 | A1* | 6/2012 | Le | E21B 43/11 |
| | | | | 166/297 |

\* cited by examiner

US 10,613,239 B2

PROPELLANT STIMULATION FOR MEASUREMENT OF TRANSIENT PRESSURE EFFECTS OF THE PROPELLANT

CROSS-REFERENCE TO RELATED APPLICATION

The present application is a U.S. National Stage Application of International Application No. PCT/US2017/035677 filed Jun. 2, 2017, which is incorporated herein by reference in its entirety for all purposes.

TECHNICAL FIELD

The present disclosure relates generally to evaluation of equipment utilized and operations performed in conjunction with a subterranean well, more particularly, to use of propellant stimulation for the measurement of transient pressure effects of the propellant.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Measurements of the subterranean formation may be made throughout the operations to characterize the formation and aide in making operational decisions. In certain instances, a communication interface of a downhole tool may be used to communicate data associated with measurements of the formation or other downhole parameters.

A perforating tool system is commonly used to maximize the potential recover of such hydrocarbons. However, for a given operation, the perforating tool system may be selected based on little to no knowledge of the likely downhole charge performance, pore pressure or chamber integrity. Additional data is necessary to more accurately select and configure the appropriate perforating tool system for a given operation.

FIGURES

Some specific exemplary embodiments of the disclosure may be understood by referring, in part, to the following description and the accompanying drawings.

Figure 1:
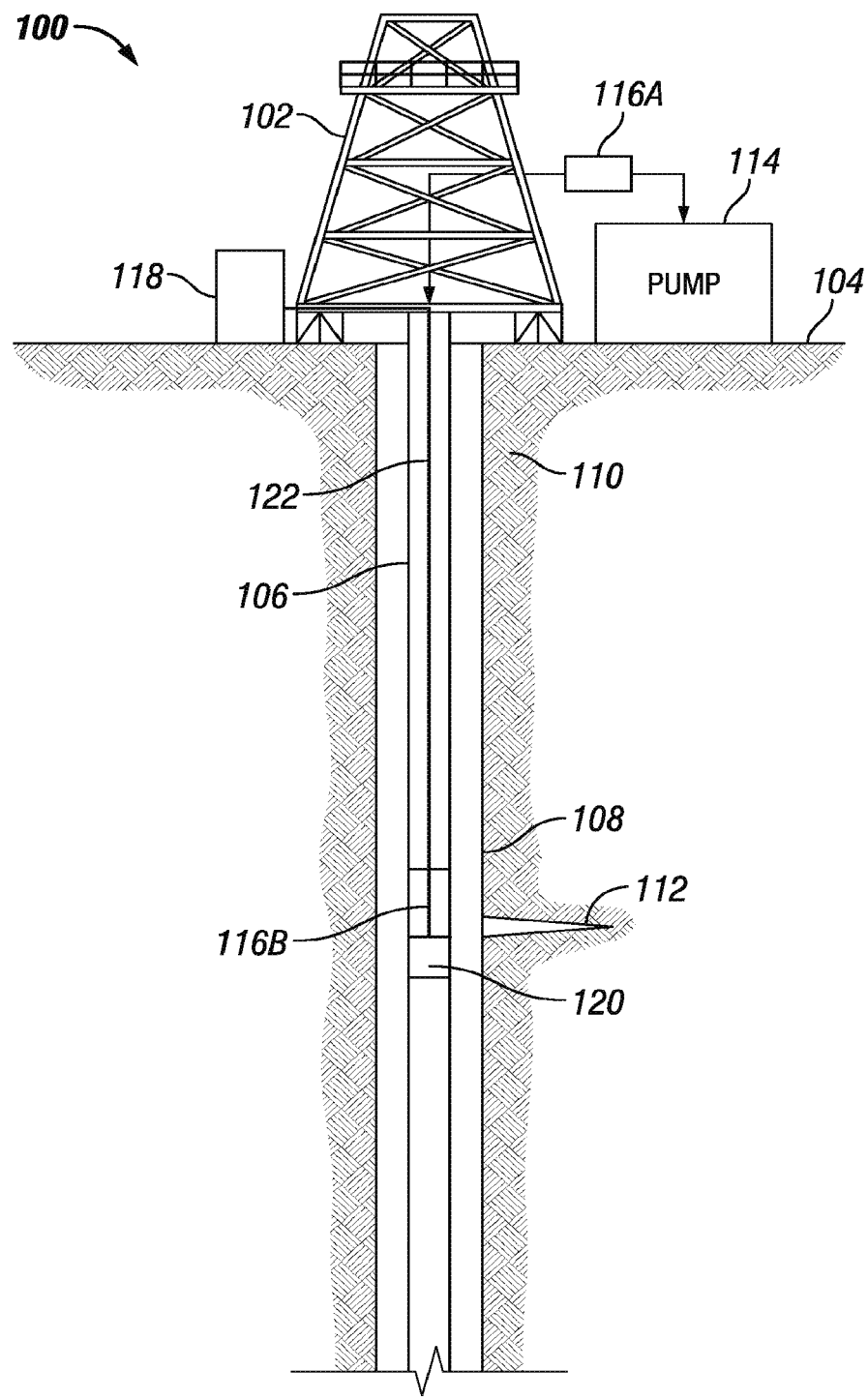
FIG. 1 is a diagram showing an illustrative well system with a perforating tool system, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

The American Petroleum Institute Recommended Practices (API RP) 19B Section 2 and Section 4 provide a standard for testing performance of a downhole perforating environment. However, a need exists for a testing environment to test the propellant-assisted perforating technique using this standard methodology. Embodiments of the present disclosure relate to a test fixture that allows the use of propellant stimulation during an API RP 19B Section 2 or Section 4 test which allows for the measurement of the transient pressure effects of the propellant.

Various aspects of the present disclosure may be implemented in various environments. For example, FIG. 1 is a diagram showing an illustrative well system 100 with a perforating tool system, according to aspects of the present disclosure. The well system 100 includes a derrick 102 positioned at a surface 104. The derrick 102 may support components of the well system 100, including a tubing string 106. The tubing string 106 may include segmented pipes that extend below the surface 104 and into a wellbore 108. The wellbore 108 may extend through subterranean formations 110 in the earth adjacent to the wellbore 108. The subterranean formations 110 may include a perforation, an opening or a fracture 112, referred to generally herein as fracture 112. In some aspects, the fracture 112 may be a separation of the subterranean formation 110 forming a fissure or crevice in the subterranean formations 110. In additional aspects, the fracture 112 may be created by a fracturing process in which highly pressured gas is forced into the formations 110 via perforating tool system or assembly 120. A pump 114 is positioned at the surface 104 proximate to the wellbore 108 to pump a fluid into the wellbore. The fluid may be pumped into the wellbore at a rate to expand the fracture 112 or to fill a perforation or fracture 112. The fracture 112 may serve as a path for the production of hydrocarbons from subterranean reservoirs. A slow-injection pumping device may be included to inject additional fluid into the fracture 112 to further open or extend the fracture 112 in the subterranean formation 110. In one or more aspects, the slow-injection pumping device 116A may be positioned at the surface as depicted in FIG. 1. In one or more aspects, the slow-injection pumping device may be positioned on the tubing string 106 as depicted by block 116B. Proppant and other additives may be added to the fluid during or prior to the fluid traversing the pump 114. The proppant may remain in the fracture 112 after the fracturing process is completed to keep the fracture 112 from completely closing.

A perforating tool system 120, according to one or more aspects of the present invention, may also be positioned or deployed downhole. In one or more embodiments, perforating tool system 120 may be positioned along, included with or coupled to the tubing string 106, a bottom-hole assembly, or any other suitable downhole deployment device or tool. A perforating tool system 120 may utilize propellant stimulation to enhance or expand a fracture 112. Perforating tool system 120 may comprise propellant disposed, for example, about a sleeve, that when activated or deflagrated create a tunnel (for example, expand a fracture 112) through the casing or liner disposed within the wellbore 108 into the formation 110. The perforating tool system 120 may be coupled via an electrical connection 122 to a control unit 118 at the surface 104.

In one or more embodiments, control unit 118 may be positioned downhole or remote from the wellbore environment 100. Control unit 118 may transmit a signal to perforating tool system 120 to initiate deflagration of the propellant (not shown) disposed within the perforating tool system 120. In one or more embodiments, electrical connection 122 may be any material suitable for conveying an electrical signal including but not limited to a wireline, one or more cables (such as a detonator cable), or any other suitable conductive wire or connection. Perforating tool system 120 may be configured according to or based, at least in part, on any one or more aspects of the present disclosure.

Figure 2:
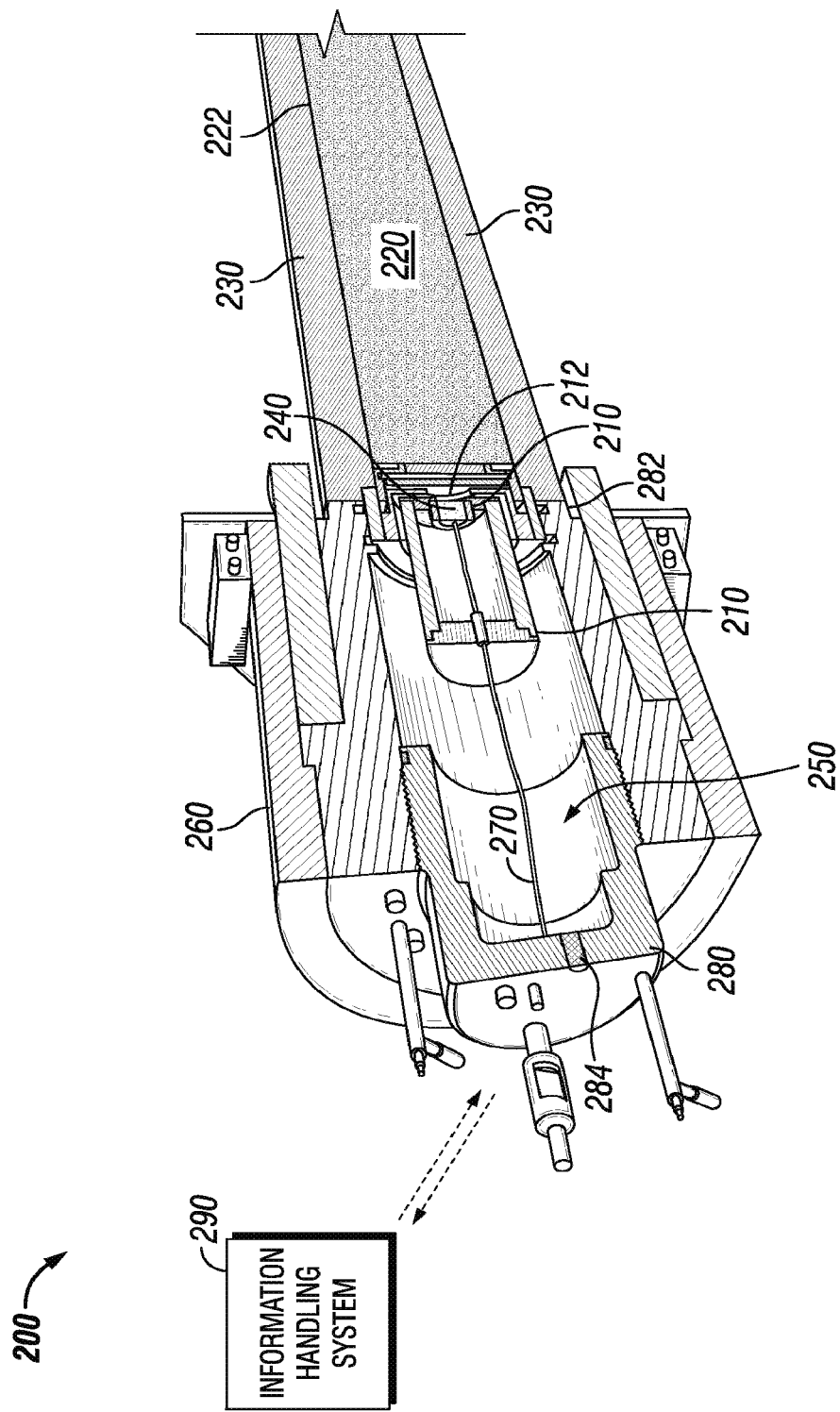
FIG. 2 is a diagram showing an illustrative view of a well simulator pressure vessel, according to one or more aspects of the present disclosure.

FIG. 2 is a diagram showing an illustrative view of a well simulator pressure vessel 200, according to aspects of the present disclosure. The well simulator pressure vessel 200, comprises a simulated wellbore chamber 260. Simulated wellbore chamber assembly 260 may be cylindrically shaped as illustrated in FIG. 2. In one or more embodiments simulated wellbore chamber assembly 260 may be any suitable shape that permits stimulation of a formation sample 220 by a simulated perforating tool system 210 according to one or more aspects of the present disclosure. The simulated wellbore chamber assembly 260 comprises a wellbore chamber cap 280 to seal the simulated wellbore chamber assembly 260 (or the simulated wellbore 282) to maintain a pressure in the simulated wellbore chamber assembly 260 (or the simulated wellbore 282). The wellbore chamber cap 280 may comprise one or more sensors 284 mounted in an interior (as shown) or on an exterior of the wellbore chamber cap 280 (not shown). The one or more sensors 284 may be coupled directly or indirectly to an information handling system 290. In one or more embodiments, information handling system 290 may comprise one or more information handling systems 700 illustrated in FIG. 7.

A simulated wellbore 282 is disposed about an interior 250 of the simulated wellbore chamber assembly 260 and coupled to a formation sample 220. The simulated wellbore 282 is pressurized to apply a pressure that approximates an actual, predicted or predetermined wellbore pressure to the simulated perforating tool system 210. The simulated wellbore 282 may comply with the API RP 19 Section 2 and Section 4 wellbore cavity requirements.

A simulated perforating tool system 210 is disposed or positioned within an interior 250 of the simulated wellbore chamber assembly 260 or simulated wellbore 282. The simulated perforating tool system 210 may be any type of laboratory gun assembly that comprises a shaped charge 240. A propellant disk assembly 212 may be coupled to, mounted, disposed or positioned inside or otherwise part of the simulated perforating tool assembly 210. The simulated perforating tool system 210 may include any one or more components required for a given operation. A connector 270 may couple to the shaped charge 240 of the simulated perforating tool system 210. Connector 270 may comprise one or more electrical wires that conduct a signal. The connector 270 may pass through an aperture at one end of the simulated perforating tool system 210 or any other location of the simulated perforating tool system 210. The connector 270 may be directly or indirectly coupled or communicatively coupled to a power source or information handling system 290 such that an electrical signal is provided to detonate the shaped charge 240. The detonation of shaped charge 240 may be controlled manually or by execution of one or more instructions of a software program executing on an information handling system 290. While only one shaped charge 240 is illustrated, the present disclosure contemplates any number of shaped charges 210 in any number of configurations. In one or more embodiments, a propellant disk assembly 212 may simulate a sleeve mounted to an exterior of the simulated perforating tool system 210 such that when the shaped charge 240 is detonated the propellant is deflagrated.

Propellant disk assembly 212 may comprise a propellant (not shown). In one or more embodiments, the propellant is ignitable by the detonation of any one or more shaped charges 240. In one or more embodiments, the propellant disk assembly 212 couples to the connector 270 or any other detonation device or mechanism and a signal transmitted via the connector 270 ignites the propellant. The propellant disk assembly 212 also couples to the simulated perforating tool system 210. The propellant disk assembly 212 provides propellant-assisted extension or expansion of a formation sample 220. The propellant disk assembly 212 provides propellant stimulation to allow for measurement of the transient pressure effects of the propellant, for example, during an API RP 19B Section 2 or Section 4 test.

The well simulator pressure vessel 200 may comprise one or more overburden chambers 230 disposed about the formation sample 220. The overburden chamber 230 comprises an overburden fluid. The formation sample 220 may be isolated from the overburden chamber 230 by a rubber jacket 222. One or more gas or oil charged flow loops (not shown) may be plumbed in upstream and downstream of the formation sample 220 to absorb the hydraulic shock of the perforation event and simulate the pressure surges that would accompany a downhole perforation.

Figure 3:
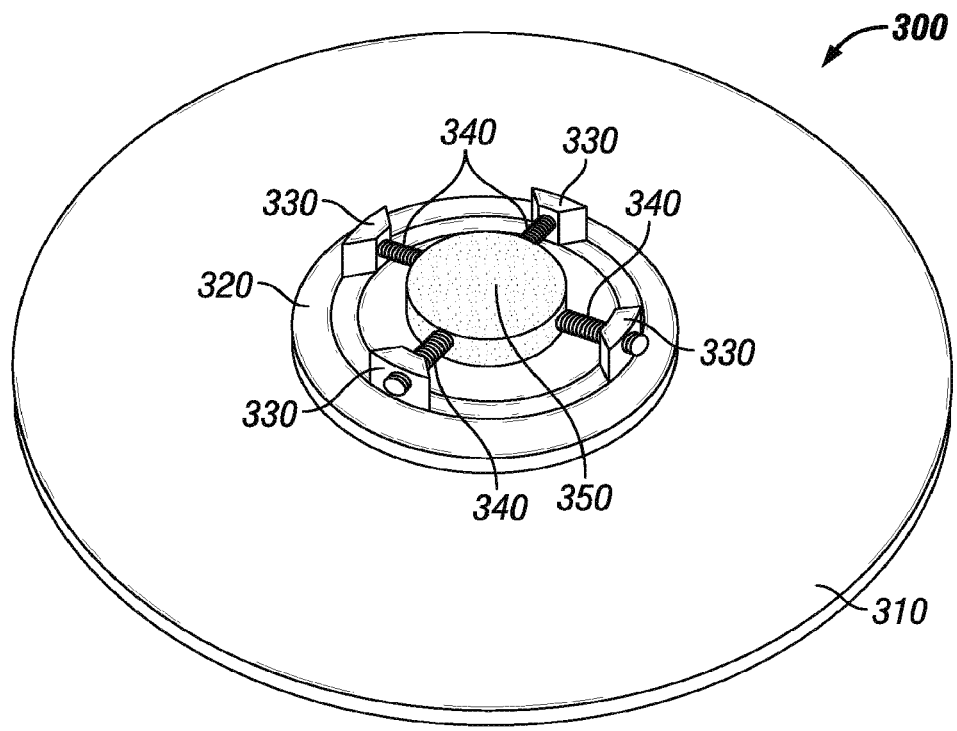
FIG. 3 is a diagram of a view of a laboratory gun simulated scallop assembly, according to one or more aspects of the present disclosure.

FIG. 3 is a view of a laboratory gun simulated scallop assembly 300, according to one or more aspects of the present disclosure. laboratory gun simulated scallop assembly 300 comprises a laboratory gun simulated scallop 310. Laboratory gun simulated scallop 310 is an end plate of the simulated perforating tool system 210. Propellant disk assembly 212 couples to the simulated perforating tool system 210 via the laboratory gun simulated scallop 310. In one or more embodiments, laboratory gun simulated scallop 310 comprises a mounting plate 320. For example, mounting plate 320 may be coupled to or disposed about the laboratory gun simulated scallop 310 or may be formed or molded as part of the laboratory gun simulated scallop 310. Mounting plate 320 may be a raised plate, for example, a raised circular plate as illustrated in FIG. 3. In one or more embodiments, mounting plate 320 may be flush with laboratory gun simulated scallop 310 or may comprise beveled edges, or comprise any suitable shape according to a selected simulated perforating tool system 210.

Mounting plate 320 may comprise an assembly to secure a propellant 350 to the mounting plate 320. For example, mounting plate 320 may comprise one or more mounts 330. In one or more embodiments, one or more mounts 330 may be coupled to, disposed about or otherwise formed or molded as part of the laboratory gun simulated scallop 310. Mounts 330 may comprise any one or more of mounting ears, receptacles, supports, protrusions, prongs any other device or mechanism suitable to secure a propellant 350 to the mounting plate 320 or any other element or surface of the laboratory gun simulated scallop 310. The one or more mounts 330 may comprise one or more set screws 340. A set screw 340 may comprise any one or more of a bolt, screw, wire, brad, or any other device or mechanism suitable to secure the propellant disk to the mounting plate 320 or any other element or surface of the laboratory gun simulated scallop 310 via the one or more mounts 330. In one or more embodiments, propellant 350 is secured or coupled to the laboratory gun simulated scallop 310 via at least one mount 330, at least one set screw 340 or any combination thereof. For example, in one or more embodiments one or more mounts 330 may comprise a spring-loaded mount such that propellant 350 is secured by a force applied by a spring (not shown). In one or more embodiments, one or more mounts 330 may comprise one or more prongs that secure the propellant 350 via a tension of the prongs. In one or more embodiments, one or more set screws 340 may extend through the propellant 350 to the laboratory gun simulated scallop 310. In one or more embodiments, one or more set screws 340 may secure or hold the propellant 350 in place as the shaped charge jet hits the propellant 350.

Propellant 350 may comprise any type of propellant to assist perforation or stimulation of a formation sample 220. The selection of propellant 350 may simulate the use of a propellant sleeve. In one or more embodiments propellant 350 may comprise an oxidizer consisting of ammonium perchlorate or potassium perchlorate that is mixed with a resin material and molded into the form of a cylindrical sleeve, for example, to polyvinyl chloride (PVC) pipe. While propellant 350 is illustrated as having a disk-shape, the present contemplates that propellant 350 may comprise any shape, dimensions or weight suitable for a given operation.

Figure 4:
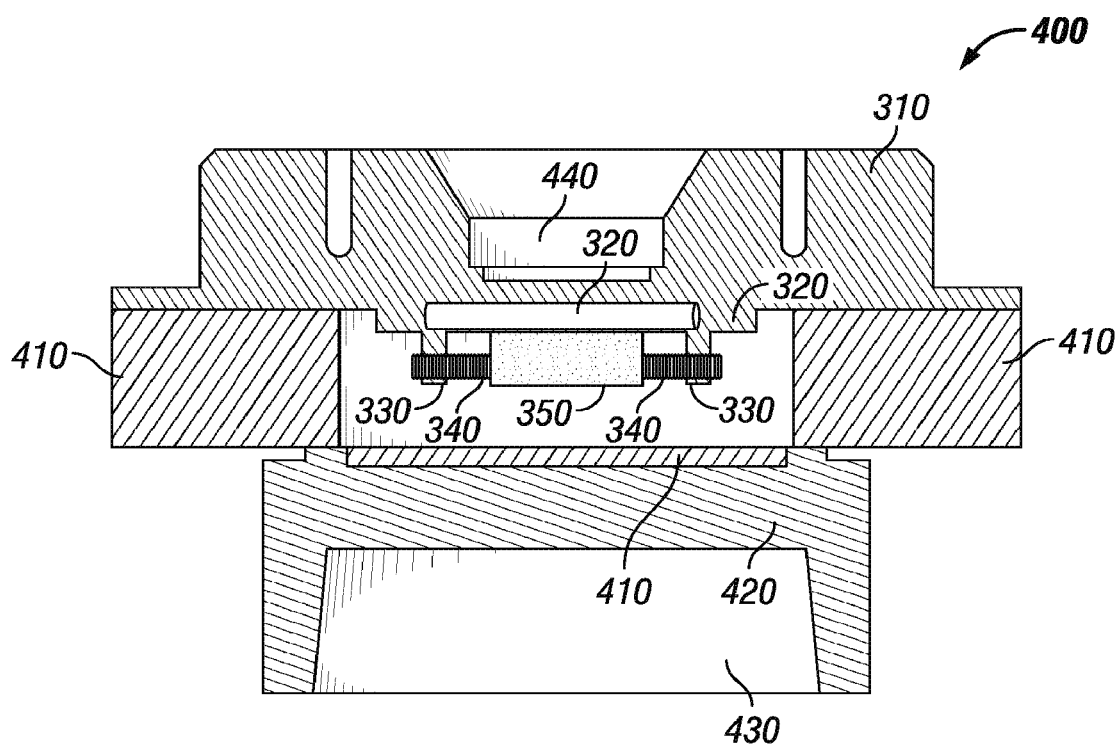
FIG. 4 is a diagram of a cross-section view of a laboratory gun simulated scallop assembly, according to one or more aspect of the present disclosure.

FIG. 4 is a cross-sectional view of a laboratory gun simulated scallop assembly 400, according to one or more aspect of the present disclosure. A laboratory gun simulated scallop assembly 400 may comprise a laboratory gun simulated scallop 310 that couples to the simulated perforating tool system 210. The laboratory gun simulated scallop 310 may comprise a mounting plate 320, one or more mounts 330, and one or more set screws 340. A fluid gap 410 may be disposed between a bottom surface of the laboratory gun simulated scallop 310 and the casing coupon 420. The fluid gap 410 simulates a perforating tool system in casing. For example, a perforating tool system with a seven inch (17.78 centimeters) outer diameter in a case with a ten inch (25.4 centimeters) inner diameter may have a fluid gap 410 of 1.5 inches (3.81 centimeters). Casing coupon 420 may be coupled to a cement coupon 430. In one or more embodiments, the casing coupon 420 and the fluid gap 410 may be selected based on one or more actual well configurations selected for simulation. For example, the casing coupon 420 and the fluid gap 410 may be selected based on one or more downhole dimensions of a wellbore (that is to be simulated) associated with a casing (such as inner diameter, out diameter) or a perforating tool system (that is to be simulated). Shaped charge receptacle 440 is disposed within a portion or is part of the laboratory gun simulated scallop 310. Shaped charge receptacle 440 supports a shaped charge 240. Shaped charge receptacle 440 may have dimensions that conform to the shape of the shaped charge 240. In one or more embodiments, shaped charge receptacle 440 may have an interior such that once the shaped charge 240 is positioned within the shaped charge receptacle 440 the shaped charge 240 is flush with an outer surface of the laboratory gun simulated scallop 310. In one or more embodiments, the shaped charge receptacle 440 is selected or dimensioned or adjustable based, at least in part, on the simulated perforating tool assembly 210.

Figure 5:
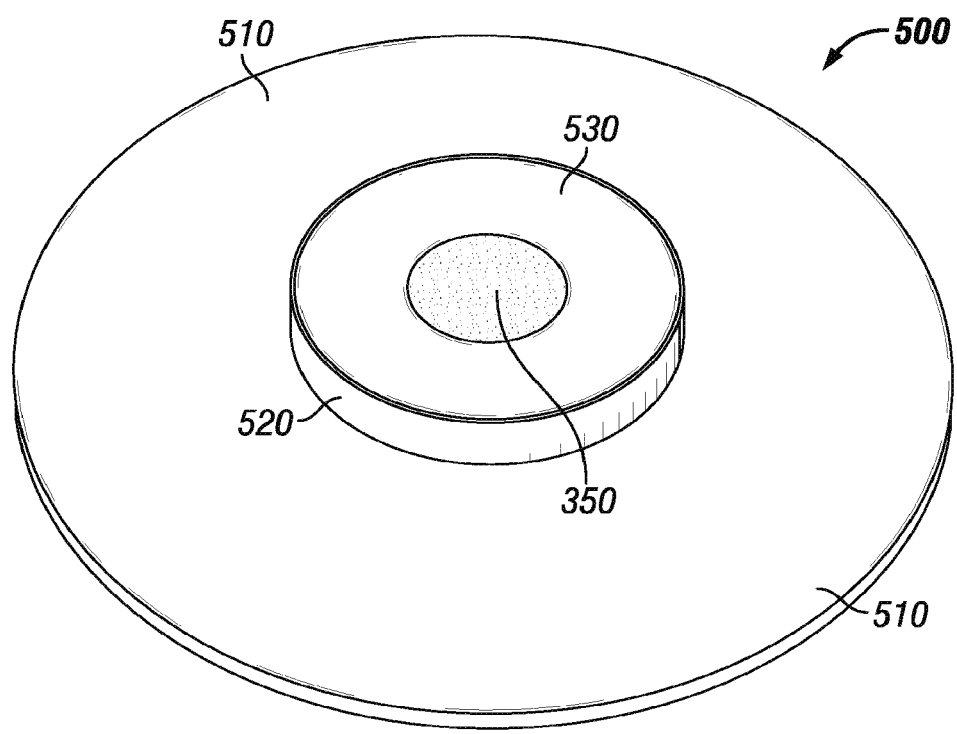
FIG. 5 is a diagram of a view of a laboratory gun simulated scallop assembly, according to one or more aspects of the present disclosure.

FIG. 5 is a diagram of a view of a laboratory gun simulated scallop assembly 500, according to one or more aspects of the present disclosure. The laboratory gun simulated scallop assembly 500 in one or more embodiments may comprise a laboratory gun simulated scallop 510 (similar to or the same as laboratory gun simulated scallop 310 in FIG. 3) and a propellant 350. Laboratory gun simulated scallop 510 may be disposed about or positioned on any one or more of mounts 330 as illustrated in FIG. 3. Laboratory gun simulated scallop 510 may comprise a form 520 that wraps around the one or more mounts 330 and the area is filled with a setting material 530 disposed within or positioned in the form, such as Hydrostone®. Prior to insertion of the propellant disk assembly 212 or after the setting material 530 has set or dried, the form 520 may be removed. In one or more embodiments, the form 520 may comprise cardboard. In one or more embodiments, the setting material 530 may secure or hold the propellant 350 in place as the shaped charge jet hits the propellant 350. The laboratory gun simulated scallop 510 provides additional support to the propellant 350 in place for the duration of time necessary to achieve deflagration of the propellant 350. For example, after the propellant 350 is impacted (explosion of the shaped charge 240), the laboratory gun simulated scallop 510 may couple or keep one or more propellant pieces together until deflagration of the propellant pieces occurs.

Figure 6:
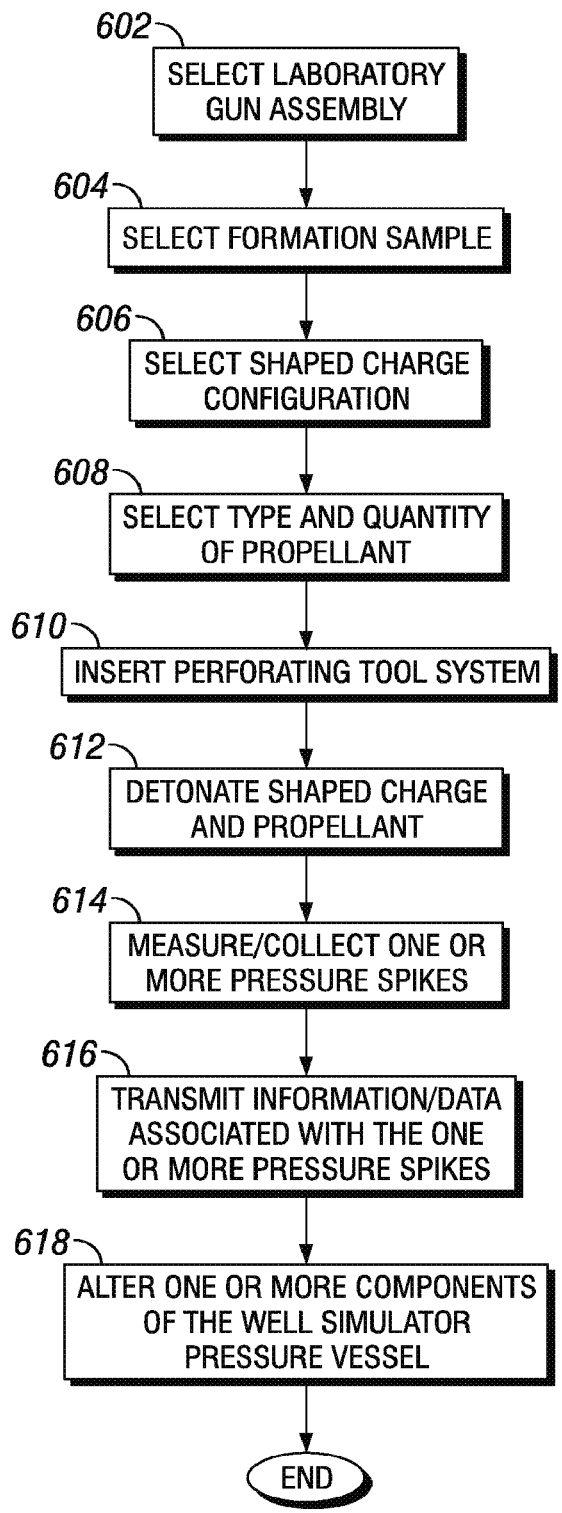
FIG. 6 is a flowchart of a method for obtaining measurements of transient pressure effects due to propellant stimulation in an API RP 19B Section 2 or Section 4 test environment, according to one or more aspects of the present disclosure.

FIG. 6 is a flowchart of a method for obtaining measurements of transient pressure effects due to propellant stimulation in as API RP 19B Section 2 or Section 4 test environment, according to one or more aspects of the present disclosure. Prior to, during or after stimulation of a formation, a simulation may be desired to determine one or more transient pressure effects due to propellant stimulation to maximize effects of the actual stimulation. For example, a simulation may measure transient pressure due to perforation of a sample, such as formation sample 220 of FIG. 2. In one or more embodiments, transient pressure may be measured using one or more sensors (for example, sensor 284) mounted in the wellbore cap (for example, wellbore chamber cap 280. In one or more embodiments, transient pressure may relate to pressure responses associated with a perforating event, for example, pressure before, during and after a perforating event. The duration of a perforating may be relatively short and thus the transient pressure may vary greatly for a short period of time. Measurements of transient pressure may be indicative of increases in pressure, decreases in pressure or both. In some instances, changes in transient pressure occur in increments of less than one second. Generally during a perforating event, a sharp increase in pressure is measured when a shaped charge is detonated due to the explosive gasses associated with the detonation. This increase in pressure is generally followed by a sharp or significant drop in pressure as the perforating tool system is filled with wellbore fluid. Use of a propellant may cause the pressure after detonation of a shaped charged to be maintained longer or prolonged, to increase the pressure, or to sustain the pressure at a certain level which assists in the removal of debris in the created perforation tunnel in the formation. Use of a propellant in addition to the shaped charge may also expand a fracture or cause further fracturing in the formation. Obtaining information from the simulation for use at the wellbore or actual stimulation environment or location may reduce costs and increase production of hydrocarbons or any other material.

In one or more embodiments, at step 602 a simulated perforating tool system 210 is selected for use in a well simulator pressure vessel 200. The simulated perforating tool system 210 may be selected based, at least in part, on one or more factors including, but not limited to, the expected or known type of formation (for example, formation 110 of FIG. 1), the location of the site (for example, location of well system 100), one or more expected or known depth for stimulation, one or more parameters associated with the wellbore (for example, overburden pressure, pore pressure, wellbore pressure, oil flow, gas flow, type of wellbore fluid, type of perforating tool system, type of casing (for example, thickness, grade, hardness, cement)) any other factors or combinations thereof. The simulated perforating tool system 210 may be adjusted, modified or altered during any part of the simulation or test based, at least in part, on any one or more of the one or more factors.

At step 604, a formation sample (for example, formation sample 220 of FIG. 2) is selected. At step 606, a shaped charge configuration is selected, for example, a configuration for one or more shaped charges 240 of FIG. 2. For example, in one or more embodiments a plurality of shaped charges 240 are selected. In one or more embodiments, the configuration of the shaped charges 240 is selected based, at least in part, on the selected formation sample 220, the type of explosive of the shaped charge 240 or any combination thereof. The formation sample 220 may be selected based on a known type of formation (such as formation 110 in FIG. 1) or an expected formation at a location, for example, at the location of well system 100. In one or more embodiments, a formation may comprise a plurality of layers and the formation sample 220 may be selected based, at least in part, on any one or more of these layers.

At step 608, the type and quantity of propellant (for example, propellant 350 of FIG. 3) may be selected. For example, the type of propellant 350 may be selected to simulate the use of a propellant sleeve. In one or more embodiments, the propellant 350 may be formed into any shape or may comprise any quantity or weight as suitable for a given simulation for a stimulation of perforation of formation sample 220. In one or more embodiments, the type and quantity of propellant 350 may be determined based, at least in part, on a computer simulation where the quantity of explosive (for example, shaped charge 240 of FIG. 2) and propellant (for example, propellant 350 of FIG. 3) are varied to obtain an estimate or prediction of the maximum pressure that will be observed in a simulation according to one or more aspects of the present disclosure. In one or more embodiments, the computer simulation may be performed without introduction of propellant (at least initially). In one or more embodiments, the initial quantity of explosive for the computer simulation may be based, at least in part, on a quantity of explosive determined for initial use at the actual location, for example, the location of well system 100. Data generated from the simulation may be used to construct a testing matrix that is used during a simulation using the well simulator pressure vessel 200. An example testing matrix is illustrated in Table 1.

TABLE 1

| Test Number | Explosive grams | STIM Mass (g) |
| --- | --- | --- |
| 160211-01 | 25 | 0 |
| 160211-01R | 25 | 0 |
| 160211-02 | 25 | 0 |
| 160211-03 | 7 | 5 |

TABLE 1-continued

| Test Number | Explosive grams | STIM Mass (g) |
|---|---|---|
| 160211-04 | 7 | 15 |
| 160211-05 | 7 | 25 |
| 160211-06 | 17.5 | 10 |
| 160211-07 | 17.5 | 20 |
| 160211-08 | 17.5 | 30 |
| 160211-09 | 25 | 20 |
| 160211-10 | 25 | 25 |
| 160211-11 | 25 | 30 |
| 160211-12 | 17.5 | 0 |
| 160211-13 | 17.5 | 30 |
| 160211-14 | 25 | 30 |

At step 610, the perforating tool system 120 including, but not limited to, a simulated perforating tool system 210 with the selected configuration of one or more shaped charges 240 and the propellant disk assembly 212 is inserted into the simulated wellbore chamber assembly 260 of the well simulator pressure vessel 200. The simulated wellbore chamber assembly 260 may be pressurized, for example, to simulate downhole pressure at a given depth in wellbore, for example, wellbore 108 of FIG. 1.

At step 612, the one or more shaped charges 240 are detonated and the propellant 350 is deflagrated. For example, a signal from an information handling system (for example, information handling system 290 or FIG. 2) or control unit (for example, control unit 118 of FIG. 1) may be transmitted via connector 270 to cause detonation of the one or more shaped charges 240. The detonation of the one or more shaped charges 240 deflagrates the propellant 350. While electrical detonation is discussed, the present disclosure contemplates any other suitable detonation of shaped charges 240 by any incendiary mechanism including, but not limited to, any one or more of electrical, mechanical, or hydraulic mechanisms or by a spark or a flame or by any other ignition.

At step 614, pressure is measured or collected, for example, one or more pressure spikes or dips are measured or collected. The pressure may be measured for any one or more configurations of the shaped charges 240, one or more selections of propellant 350, type of simulated perforating tool system 210, or any combination thereof. The pressure may be measured using high speed pressure measurement equipment. The high speed pressure equipment may comprise one or more information handling systems, for example, one or more information handling system 290 of FIG. 2 or 700 of FIG. 7 or one or more sensors (for example, sensor 284 of FIG. 2) mounted, disposed or positioned in or on the wellbore chamber cap 280 or otherwise mounted, disposed or positioned in or about the simulated perforating tool system 210.

At step 616, information or data associated with the one or more measurements of the one or more pressure spikes is transmitted to an information handling system for processing. For example, the one or more measurements may be transmitted or calculations based, at least in part, on the one or more measurements may be transmitted information handling system 290 of FIG. 2 or 700 of FIG. 7.

At step 618, one or more components of the well simulator pressure vessel 200 may be modified, altered or changed based, at least in part, on the one or more measurements from step 616 or on a testing matrix or any combination thereof. For example, the one or more components may be modified after one or more tests or simulations. The one or more components may be modified, altered or changed to affect the magnitude of the one or more pressure spikes. In one or more embodiments, the simulated perforating tool system 210, the propellant 350, the shaped charges 240, the configuration of shaped charges 240, the pressure in the well simulator pressure vessel 200, any one or more of the one or more factors, or any combination thereof may be modified, altered or changed and another simulation (for example, starting at steps 602) may be performed. For example, the simulated perforating tool system 210 may be modified based, at least in part, on a measurement indicative of pressure. In one or more embodiments, modifying the simulated perforating tool system may comprise altering an amount of explosive of a shaped charge 240 or propellant 350, a type of a shaped charge 240 or propellant 350, quantity of shaped charges 240 or propellants 350 or any combination thereof such that the modification has an effect on one or more subsequent measurements during a subsequent simulation.

The present disclosure contemplates that any one or more steps of FIG. 6 may be may be performed in any order or not performed at all.

Figure 7:
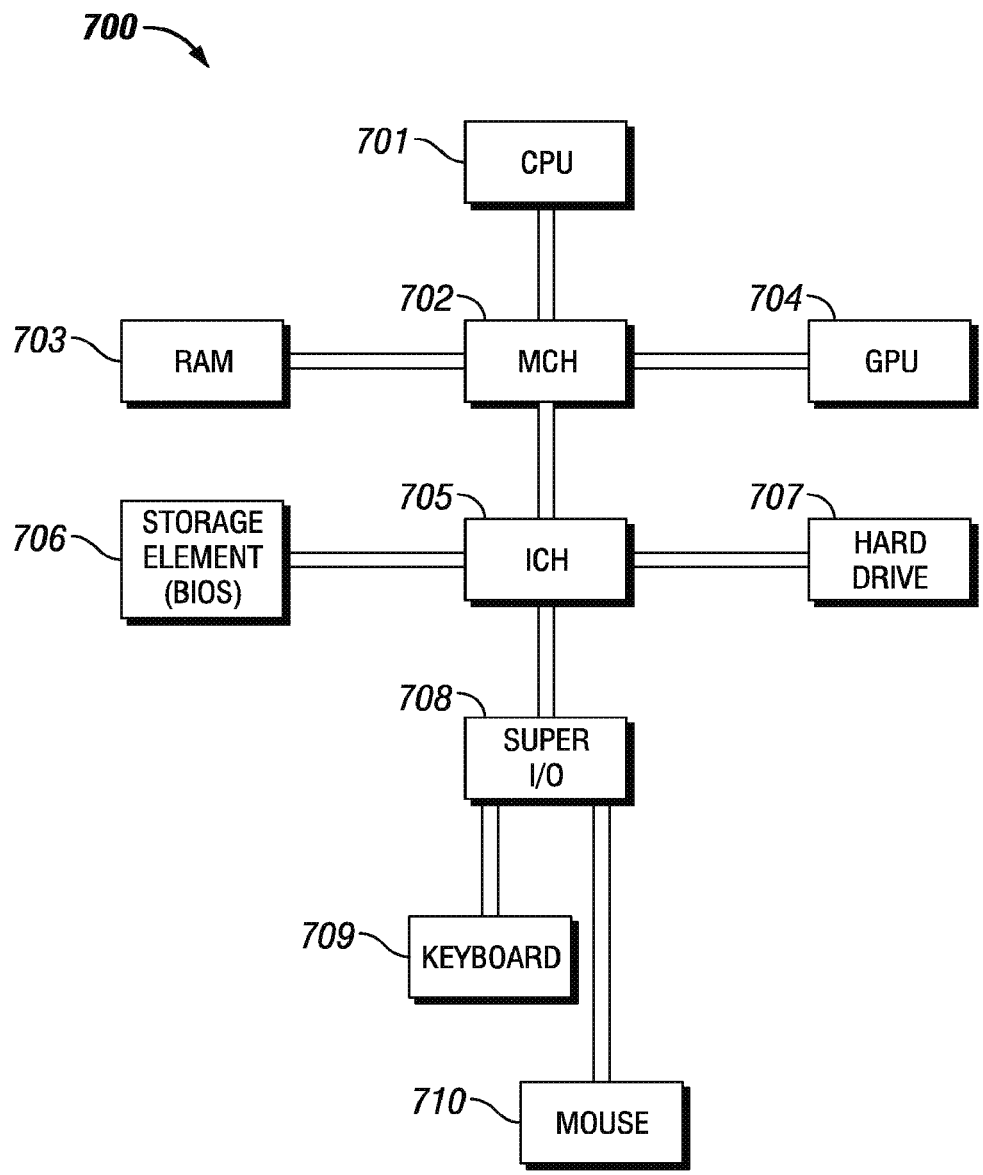
FIG. 7 is a diagram illustrating an example information handling system, according to one or more aspects of the present disclosure.

FIG. 7 is a diagram illustrating an example information handling system 700, according to aspects of the present disclosure. The control unit 118 may take a form similar to the information handling system 700. A processor or central processing unit (CPU) 701 of the information handling system 700 is communicatively coupled to a memory controller hub (MCH) or north bridge 702. The processor 701 may include, for example a microprocessor, microcontroller, digital signal processor (DSP), application specific integrated circuit (ASIC), or any other digital or analog circuitry configured to interpret and/or execute program instructions and/or process data. Processor 701 may be configured to interpret and/or execute program instructions or other data retrieved and stored in any memory such as memory 703 or hard drive 707. Program instructions or other data may constitute portions of a software or application for carrying out one or more methods described herein. Memory 703 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 403 for execution by processor 701.

Modifications, additions, or omissions may be made to FIG. 7 without departing from the scope of the present disclosure. For example, FIG. 7 shows a particular configuration of components of information handling system 700. However, any suitable configurations of components may be used. For example, components of information handling system 700 may be implemented either as physical or logical components. Furthermore, in some embodiments, functionality associated with components of information handling system 700 may be implemented in special purpose circuits or components. In other embodiments, functionality associated with components of information handling system 700 may be implemented in configurable general purpose circuit or components. For example, components of information handling system 700 may be implemented by configured computer program instructions.

Memory controller hub 702 may include a memory controller for directing information to or from various system memory components within the information handling system 700, such as memory 703, storage element 706, and hard drive 707. The memory controller hub 702 may be coupled to memory 403 and a graphics processing unit (GPU) 704. Memory controller hub 702 may also be coupled to an I/O controller hub (ICH) or south bridge 705. I/O controller hub 705 is coupled to storage elements of the information handling system 700, including a storage element 706, which may comprise a flash ROM that includes a basic input/output system (BIOS) of the computer system. I/O controller hub 705 is also coupled to the hard drive 407 of the information handling system 700. I/O controller hub 705 may also be coupled to a Super I/O chip 708, which is itself coupled to several of the I/O ports of the computer system, including keyboard 709 and mouse 710.

By performing testing and simulation of a perforating tool system 120 in the controlled environment of well simulator pressure vessel 200, the performance of a perforating tool system 120 may be determined above ground and optimized prior to deployment downhole which reduces costs of a given operation.

In one or more embodiments, a method of testing a perforating tool system comprises disposing a propellant disk assembly in a perforating tool system, wherein the propellant disk assembly comprises a propellant, disposing the perforating tool system in a simulated wellbore of a well simulator pressure vessel, wherein the perforating tool system comprises one or more shaped charges, disposing a formation sample adjacent the perforating tool system in the well simulator pressure vessel, pressurizing the simulated wellbore, detonating the one or more shaped charges, igniting the propellant, collecting one or more pressure measurements associated with a performance of the perforating tool system and modifying the perforating tool system based, at least in part, on at least one of the one or more measurements. In one or more embodiments, the method further comprises selecting a configuration for the one or more shaped charges based, at least in part, on the formation sample. In one or more embodiments, pressurizing the simulated wellbore comprises pressurizing an interior of the simulated wellbore. In one or more embodiments, detonating the one or more shaped charges comprises transmitting a signal from an information handling system via a connector to the one or more shaped charges. In one or more embodiments, the method further comprises securing the propellant to a laboratory gun simulated scallop of the propellant disk assembly. In one or more embodiments, the method further comprises disposing the one or more shaped charges at or about the propellant disk assembly. In one or more embodiments, the propellant is ignited after a timed interval from detonation of the one or more shaped charges.

In one or more embodiments, a well simulator pressure vessel comprises a well simulator pressure vessel, a simulated wellbore disposed within the well simulator pressure vessel, a formation sample coupled to the simulated wellbore chamber assembly, and a perforating tool system disposed within the simulated wellbore chamber assembly, wherein the perforating tool system comprises a perforating tool system, one or more shaped charges disposed within the perforating tool system, wherein the one or more shaped charges are detonatable to cause one or more perforations in the formation sample and modifying the perforating tool system based, at least in part, on at least one of the one or more measurements. In one or more embodiments, the well simulator pressure vessel further comprises a simulated wellbore of the simulated wellbore chamber assembly, wherein a pressure of the simulated wellbore is alterable. In one or more embodiments, the well simulator pressure vessel further comprises a simulated wellbore of the simulated wellbore chamber assembly, wherein a pressure of the simulated wellbore is alterable. In one or more embodiments, the well simulator pressure vessel further comprises a wellbore chamber cap, wherein the wellbore chamber cap seals the simulated wellbore to maintain the pressure in the simulated wellbore. In one or more embodiments, the propellant disk assembly comprises a laboratory gun simulated scallop. In one or more embodiments, the laboratory gun simulated scallop comprises a mounting plate that secures the propellant to the laboratory gun simulated scallop. In one or more embodiments, the mounting plate comprises one or more mounts that secure the propellant. In one or more embodiments, the well simulator pressure vessel further comprises a connector coupled to the one or more shaped charges.

In one or more embodiments, a system for measuring transient pressure effects comprises a well simulator pressure vessel coupled to an information handling system, a simulated wellbore disposed within the well simulator pressure vessel, a formation sample coupled to the simulated wellbore, a perforating tool system disposed within the simulated wellbore, wherein the perforating tool system comprises one or more shaped charges disposed within the perforating tool system, wherein the one or more shaped charges are detonatable to cause one or more perforations in the formation sample and a propellant disk assembly coupled to the perforating tool system, wherein the propellant disk assembly comprises a propellant and wherein the information handling system receives one or more measurements of a transient pressure effect associated with the one or more perforations of the formation sample. In one or more embodiments, the simulated wellbore is pressurizable. In one or more embodiments, the system for measuring transient pressure effects further comprises a wellbore chamber cap, wherein the wellbore chamber cap seals the simulated wellbore to maintain a pressure in the simulated wellbore. In one or more embodiments, the propellant disk assembly comprises a laboratory gun simulated scallop. In one or more embodiments, the laboratory gun simulated scallop comprises a mounting plate that secures the propellant to the laboratory gun simulated scallop. In one or more embodiments, the laboratory gun simulated scallop comprises a mounting plate that secures the propellant to the laboratory gun simulated scallop.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method of testing a perforating tool system, comprising:
   disposing a propellant disk assembly in a perforating tool system, wherein the propellant disk assembly comprises a propellant;

disposing the perforating tool system in a simulated wellbore of a well simulator pressure vessel, wherein the perforating tool system comprises one or more shaped charges;
disposing a formation sample adjacent the perforating tool system in the well simulator pressure vessel;
pressurizing the simulated wellbore;
detonating the one or more shaped charges;
igniting the propellant;
collecting one or more pressure measurements associated with a performance of the perforating tool system; and
modifying the perforating tool system based, at least in part, on at least one of the one or more measurements.

2. The method of claim 1, further comprising selecting a configuration for the one or more shaped charges based, at least in part, on the formation sample.

3. The method of claim 1, wherein pressurizing the simulated wellbore comprises pressurizing an interior of the simulated wellbore.

4. The method of claim 1, wherein detonating the one or more shaped charges comprises transmitting a signal from an information handling system via a connector to the one or more shaped charges.

5. The method of claim 1, further comprising securing the propellant to a laboratory gun simulated scallop of the propellant disk assembly.

6. The method of claim 1, further comprising disposing the one or more shaped charges at or about the propellant disk assembly.

7. The method of claim 1, wherein the propellant is ignited after a timed interval from detonation of the one or more shaped charges.

8. A well simulator pressure vessel, comprising:
a well simulator pressure vessel;
a simulated wellbore disposed within the well simulator pressure vessel;
a formation sample coupled to the simulated wellbore chamber assembly; and
a perforating tool system disposed within the simulated wellbore chamber assembly, wherein the perforating tool system comprises:
a perforating tool system;
one or more shaped charges disposed within the perforating tool system, wherein the one or more shaped charges are detonatable to cause one or more perforations in the formation sample; and
a propellant disk assembly coupled to the perforating tool system and adjacent to the formation sample, wherein the propellant disk assembly comprises a propellant.

9. The well simulator pressure vessel of claim 8, further comprising a simulated wellbore of the simulated wellbore chamber assembly, wherein a pressure of the simulated wellbore is alterable.

10. The well simulator pressure vessel of claim 9, further comprising a wellbore chamber cap, wherein the wellbore chamber cap seals the simulated wellbore to maintain the pressure in the simulated wellbore.

11. The well simulator pressure vessel of claim 8, wherein the propellant disk assembly comprises a laboratory gun simulated scallop.

12. The well simulator pressure vessel of claim 11, wherein the laboratory gun simulated scallop comprises a mounting plate that secures the propellant to the laboratory gun simulated scallop.

13. The well simulator pressure vessel of claim 12, wherein the mounting plate comprises one or more mounts that secure the propellant.

14. The well simulator pressure vessel of claim 8, further comprising a connector coupled to the one or more shaped charges.

15. A system for measuring transient pressure effects, comprising:
a well simulator pressure vessel coupled to an information handling system;
a simulated wellbore disposed within the well simulator pressure vessel;
a formation sample coupled to the simulated wellbore;
a perforating tool system disposed within the simulated wellbore, wherein the perforating tool system comprises:
one or more shaped charges disposed within the perforating tool system, wherein the one or more shaped charges are detonatable to cause one or more perforations in the formation sample; and
a propellant disk assembly coupled to the perforating tool system, wherein the propellant disk assembly comprises a propellant; and
wherein the information handling system receives one or more measurements of a transient pressure effect associated with the one or more perforations of the formation sample.

16. The system for measuring transient pressure effects of claim 15, wherein the simulated wellbore is pressurizable.

17. The system for measuring transient pressure effects of claim 16, further comprising a wellbore chamber cap, wherein the wellbore chamber cap seals the simulated wellbore to maintain a pressure in the simulated wellbore.

18. The system for measuring transient pressure effects of claim 15, wherein the propellant disk assembly comprises a laboratory gun simulated scallop.

19. The system for measuring transient pressure effects of claim 18, wherein the laboratory gun simulated scallop comprises a mounting plate that secures the propellant to the laboratory gun simulated scallop.

20. The system for measuring transient pressure effects of claim 15, wherein the laboratory gun simulated scallop comprises a mounting plate that secures the propellant to the laboratory gun simulated scallop.

* * * * *